United States Patent
Miao (10) Patent No.: US 9,231,469 B2
(45) Date of Patent: Jan. 5, 2016

(54) AUTO-TUNING CURRENT LOOP COMPENSATION FOR POWER FACTOR CORRECTION CONTROLLER

(71) Applicant: Analog Devices, Inc., Norwood, MA (US)

(72) Inventor: Botao Miao, Sunnyvale, CA (US)

(73) Assignee: Analog Devices, Inc., Norwood, MA (US)

( * ) Notice: Subject to any disclaimer, the term of this patent is extended or adjusted under 35 U.S.C. 154(b) by 253 days.

(21) Appl. No.: 14/066,911

(22) Filed: Oct. 30, 2013

(65) Prior Publication Data

US 2015/0117074 A1    Apr. 30, 2015

(51) Int. Cl.
  *G05F 5/00* (2006.01)
  *H02M 1/42* (2007.01)
  *H02M 1/00* (2007.01)

(52) U.S. Cl.
  CPC .... *H02M 1/4225* (2013.01); *H02M 2001/0012* (2013.01); *H02M 2001/0025* (2013.01)

(58) Field of Classification Search
  CPC ..... Y02B 70/126; Y02E 40/12; H02M 3/156; H02M 3/157; H02M 3/33507; G05F 1/33

USPC ........ 323/207, 211, 222, 283; 363/82, 89, 90, 363/97
  See application file for complete search history.

(56) References Cited

U.S. PATENT DOCUMENTS

| | | | | |
|---|---|---|---|---|
| 6,952,093 B1 * | 10/2005 | Broach | ................. | H02M 3/156 323/282 |
| 2014/0097808 A1 * | 4/2014 | Clark | ........................ | G05F 1/70 323/208 |
| 2015/0062985 A1 * | 3/2015 | Colbeck | .................. | H02M 1/42 363/89 |

* cited by examiner

*Primary Examiner* — Nguyen Tran
(74) *Attorney, Agent, or Firm* — Schwegman Lundberg & Woessner, P.A.

(57) ABSTRACT

An apparatus comprises a power converter circuit and a controller. The power converter circuit includes an inductor, a switching circuit, and a digital control loop circuit having an adjustable transfer function, wherein the transfer function includes a zero variable and a signal gain variable. The controller includes a tuning module configured to set a value for the zero variable, set the signal gain variable to a first gain value, determine a control error for the first gain value setting, wherein the control error is a difference between a reference current and a load current at a circuit load, iteratively update the gain value of the signal gain variable and determine the control error for the updated gain value, and set an operating gain value of the signal gain variable to the gain value corresponding to a minimum control error.

20 Claims, 7 Drawing Sheets

AUTO-TUNING CURRENT LOOP COMPENSATION FOR POWER FACTOR CORRECTION CONTROLLER

BACKGROUND

Electronic power systems typically include one or more power converters controlled by integrated circuits. Some power converters receive an alternating input (e.g., alternating current or AC input) and produce a non-alternating output (e.g., a direct current or DC output). The AC-to-DC rectifiers may introduce frequency harmonics into an electronic system that can have adverse effects, such as the neutral current magnitude of a three phase system being too high, excessive current in power-factor-correction capacitors, failure of system protection circuits, and excessive heating and reduced operating life of transformers and induction motors of the system. The present inventor has recognized a need for improved performance of power converter circuits.

Overview

This document relates generally to switching power converters and methods of their operation. An apparatus example includes a power converter circuit and a controller. The power converter circuit includes an inductor, a switching circuit, and a digital control loop circuit having an adjustable transfer function, wherein the transfer function includes a zero variable and a signal gain variable. The controller includes a tuning module configured to set a value for the zero variable, set the signal gain variable to a first gain value, determine a control error for the first gain value setting, wherein the control error is a difference between a reference current and a load current at a circuit load, iteratively update the gain value of the signal gain variable and determine the control error for the updated gain value, and set an operating gain value of the signal gain variable to the gain value corresponding to a minimum control error.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
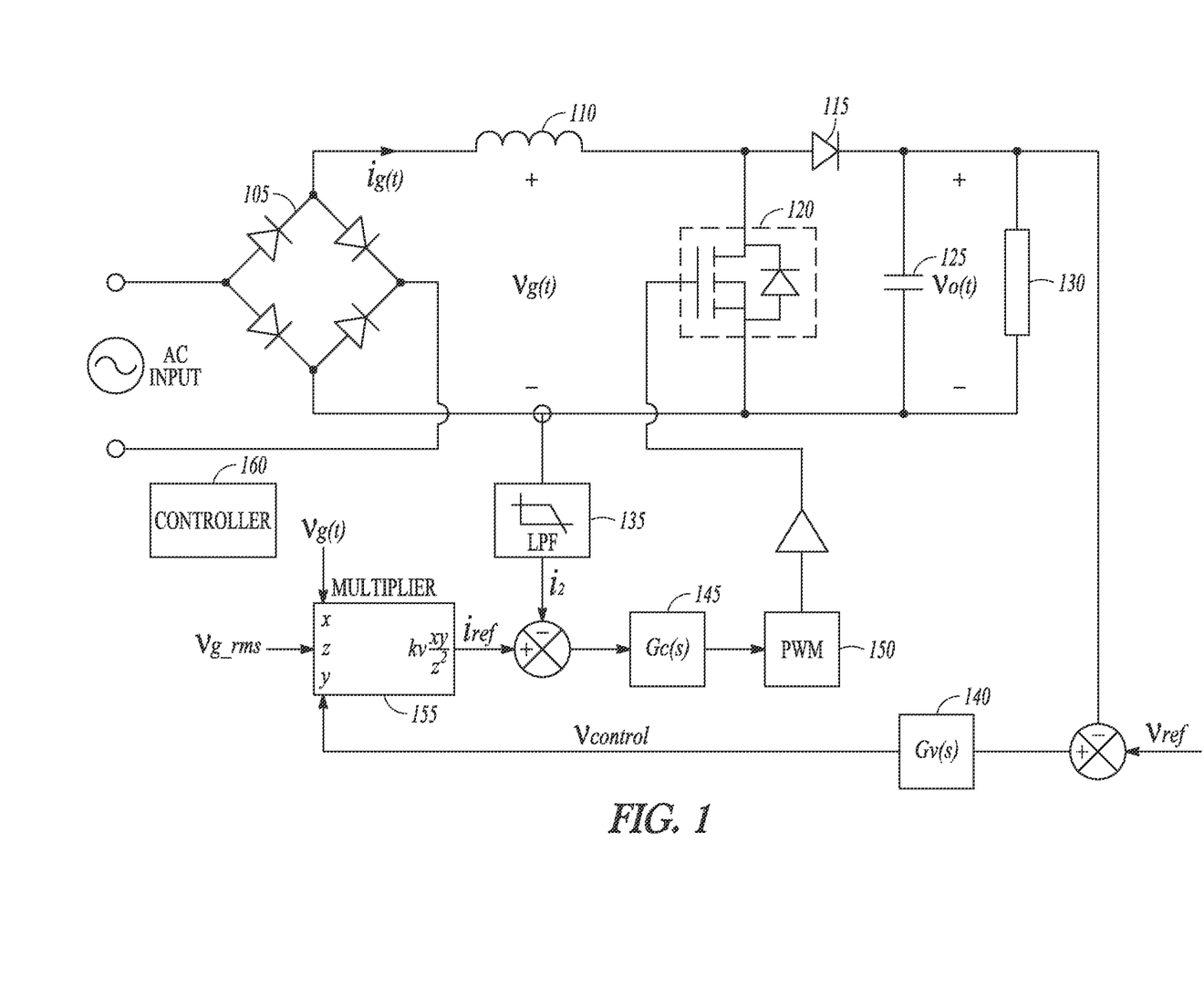
FIG. 1 shows a schematic of portions of an example of an AC to DC power converter circuit.

FIG. 1 shows a block diagram of an example of an AC to DC power converter circuit. The topology of the circuit is a boost converter with power factor correction (PFC). The boost converter topology provides flexibility in producing voltage conversion ratios, and provides lower total harmonic distortion (THD) and better transistor utilization than other topologies.

Power factor is a figure of merit for a rectifying circuit that reflects how effectively energy is transmitted between the source and load, and typically falls in the range of 1.0 to −1.0. Negative values of a power factor reflect an active load providing power to the input and are not considered herein. When the input voltage is sinusoidal and contains no harmonics, the power factor can be expressed as the product of two terms; the distortion factor and the displacement factor. The distortion factor is the ratio of the root-mean-square (RMS) value of the fundamental component of the line current to the RMS value of the total line current. The displacement factor is the cosine of the angle between the fundamental components of the ac line voltage and the ac line current waveforms. For a power factor of 1.0, it is desired to have no harmonics to the fundamental component of the current, and to have the load to the power converter appear to be purely resistive to the ac system, i.e., the voltage and current are in phase. Power factor correction refers to minimizing current harmonics and maintaining proper phase between the voltage and current.

The circuit example of FIG. 1 includes a rectifier circuit 105, an inductor 110, diode 115, switching circuit 120, and a capacitor 125 across the load 130. The circuit includes two feedback control loop circuits; an outer voltage control loop and an inner current control loop. The outer voltage control loop regulates the output voltage by controlling average power delivered to the load. The output voltage $v_o(t)$ is sensed and compared to a voltage reference $v_{ref}$. The difference between the output voltage and the reference voltage can be viewed as a voltage control error, and can be applied to voltage loop compensation filter 140 (Gv(s)) to create a control voltage $v_{control}$. The control voltage is used to adjust a reference current $i_{ref}$ for the inner current control loop. In the example shown in FIG. 1, the control voltage is applied to multiplier circuit 155 to generate the reference current $i_{ref}$. In certain examples, $$i_{ref} \propto \frac{v_g * v_{control}}{(v_{g\_rms})^2}, \quad (1)$$

where $v_g$ is the voltage at the input to the inductor 110. Thus, the multiplier circuit adjusts the reference current using the control voltage.

The inner current control loop adjusts the pulse width modulation (PWM) of the switching circuit 120 of the power converter. The input current $i_g(t)$ is sensed using a low pass filter circuit 135 (LPF) to attenuate high frequency switching harmonics. The output signal of the LPF circuit can be proportional to the low frequency average value of the input current. In certain examples, the LPF circuit extracts a current signal of the fundamental frequency of the input current. For instance, if the input to the power convert is a 60 Hz signal, the rectifier produces a rectified sine wave with a fundamental frequency of 120 Hz. This output signal of the LPF circuit is compared to $i_{ref}$ to produce an error signal that drives the current loop compensation filter 145 (Gc(s)) and the PWM block 150. Feed forward control can be used to cancel any AC input voltage disturbance, so that the DC output voltage is unaffected by such a disturbance.

Current control can produce high quality input current waveforms over a wide range of input voltages and load powers and can be implemented using analog control circuit or digital control circuits. Some disadvantages of an analog control solution include the need to sense the average input current and the need to implement a multiplier circuit 155 in the control circuit to generate $i_{ref}$. A digital control solution is easier to implement because the average current can be obtained using an oversampling analog to digital converter (ADC) and because a digital multiplier is much easier to implement than an analog multiplier circuit.

FIG. 1 also shows a controller 160 for the power converter circuit. Some examples of a controller 160 include a processor, a microprocessor, an application specific integrated circuit (ASIC), or the like. The controller 160 may include one or more modules to perform the functions described. For example, the multiplier circuit 155 may be implemented as a separate circuit from the controller 160 as shown, or can be included in the controller 160 as a module. A module can include one or any combination of software, firmware and hardware. The controller 160 can provide supervisory functions and set operating parameters of the power converter circuit. If the electrical system includes multiple power converter circuits, the controller may perform the functions for more than one power converter circuit.

Figure 2:
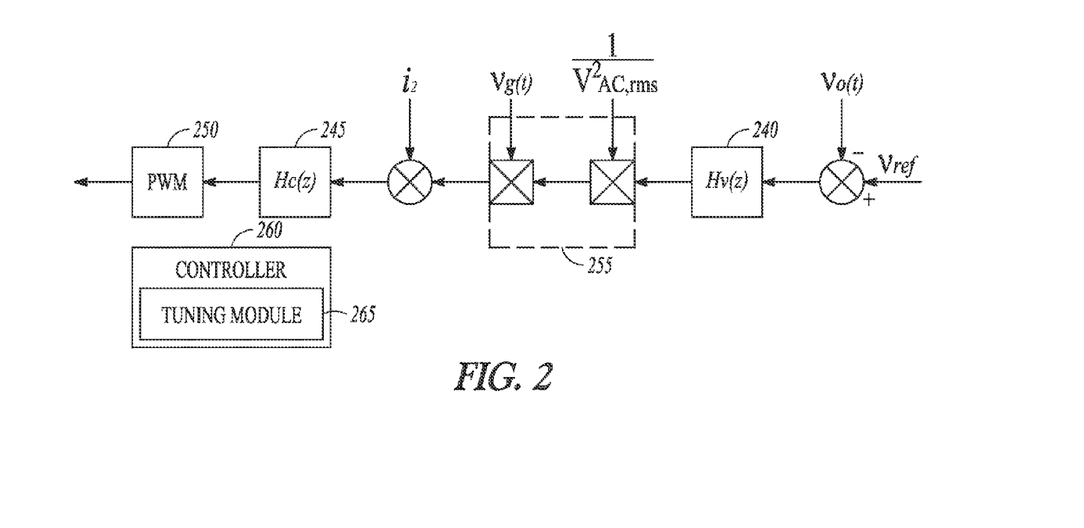
FIG. 2 shows a block diagram of portions of an example of a digital control loop circuit.

FIG. 2 shows a block diagram of portions of an example of a digital control loop circuit. The digital control loop includes a voltage loop compensation filter (Hv(z)) 240, a multiplier circuit 255, and a current loop compensation filter (Hc(z)) 245. Proportional-Integral (PI) compensation can be used for the two compensation filters. The digital implementation of each of the voltage filter and the current filter may have a transfer function that can be expressed as $$H(z) = b * \frac{(z-a)}{(z-1)}, \quad (2)$$

where a is the zero variable and b is the gain variable.

When implementing a current control loop, the compensation filters typically provide the degree of freedom to the designer. The designer chooses the filter topology (e.g., PI, or PID (proportional integral differential)), prepares small signal models of the circuit blocks, and then adjusts the parameters through simulation or based on experience. The small signal models may be based on the DC operating point of the power converter circuit. However, there are uncertainties in the operating conditions of a power converter circuit. One or both of the switching frequency and the amplitude of the input voltage may vary between applications. Also, there is a tolerance in values of the power stage components that may cause a variation in these values between implementations of the power circuit design. Hence, it is difficult for a fixed compensation filter design to be optimal for all operating conditions.

A better solution is to have self-tuning compensation filter blocks. Self-tuning or auto-tuning allows the parameters to be adjusted for each application of the power converter circuit. The self-tuning can be performed by controller 260 using a tuning module 265. The self-tuning of a compensation filter can be performed by one dedicated controller 260, or one controller 260 can tune multiple compensation filters.

In a self-tuning circuit, it is desirable to have a design goal based on circuit performance. One approach is to use a cost function as a design goal; where minimizing the cost function results in increased circuit performance. As explained previously herein, power factor correction is intended to minimize current harmonics and maintaining proper phase between the voltage and current. Therefore, a good cost function for a self-tuning filter is total harmonic distortion (THD) and the design goal of the self-tuning is to minimize THD.

Self-tuning while the circuit is online and operating can result in optimized performance of the power converter circuit for the conditions specific to the application, such as the specific values of the power components and the input voltage. Compensation filter design can be based on the frequency response. However, the complex mathematical operations involved in the frequency domain analysis (e.g., a Fast Fourier transform, or FFT) are difficult to implement online.

The complex mathematical operations can be avoided by implementing the self-tuning in the time domain. For a digital current control loop, the necessary voltage and current signals are readily available. However, for a time domain design analysis, a step response and an impulse response are normally used, but these specialized excitation signals are not suitable for online operation of a power converter circuit. Also, a mechanism is needed to adjust parameters of the compensation filter to find an optimal point that minimizes the cost function (e.g., the THD).

The input excitation signal to the power converter circuit can be a sine wave (e.g., a sixty hertz (60 Hz) sine wave). A rectified sine wave is input to the multiplier circuit 155. This results in a current reference that includes a rectified sine wave at twice the fundamental input frequency (e.g., 120 Hz). If the power converter circuit is online and is stable, the sine wave will repeat each period and the excitation signal to the current control loop is identical each period. As a result, the THD calculated over one period in the time domain can be used as the cost function.

As explained previously herein, a PI compensation filter can include a gain variable and a zero variable. The zero variable can be selected based on the switching frequency of the PWM block 150. For instance, the zero variable can be selected as one tenth or less of the switching frequency of the PWM bock 150. With the zero variable fixed at the selected value, the gain variable can be automatically swept to find the lowest value of the selected cost function (e.g., lowest THD).

Figure 3:
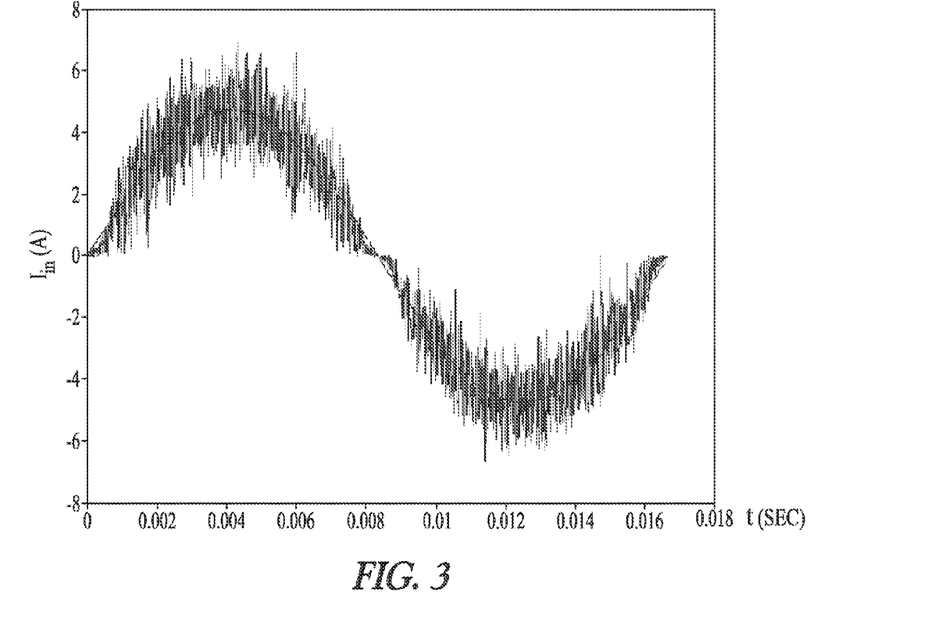
FIGS. 3 and 4 show examples of a simulation of the input current of the power converter circuit.
Figure 4:
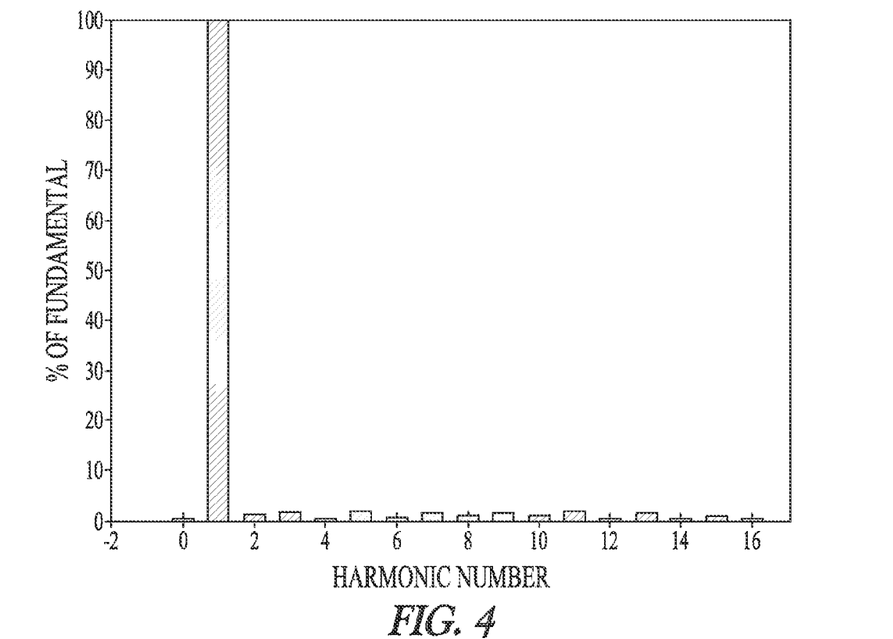

FIGS. 3 and 4 show examples of a simulation of the input current to the power converter circuit. FIG. 3 shows a simulation of the input current in the time domain. The noise about the fundamental frequency of the signal is evident in the waveform. FIG. 4 shows a simulation of the input current in the frequency domain. The fundamental frequency and harmonic frequencies are shown as a percentage of the fundamental.

Figure 5:
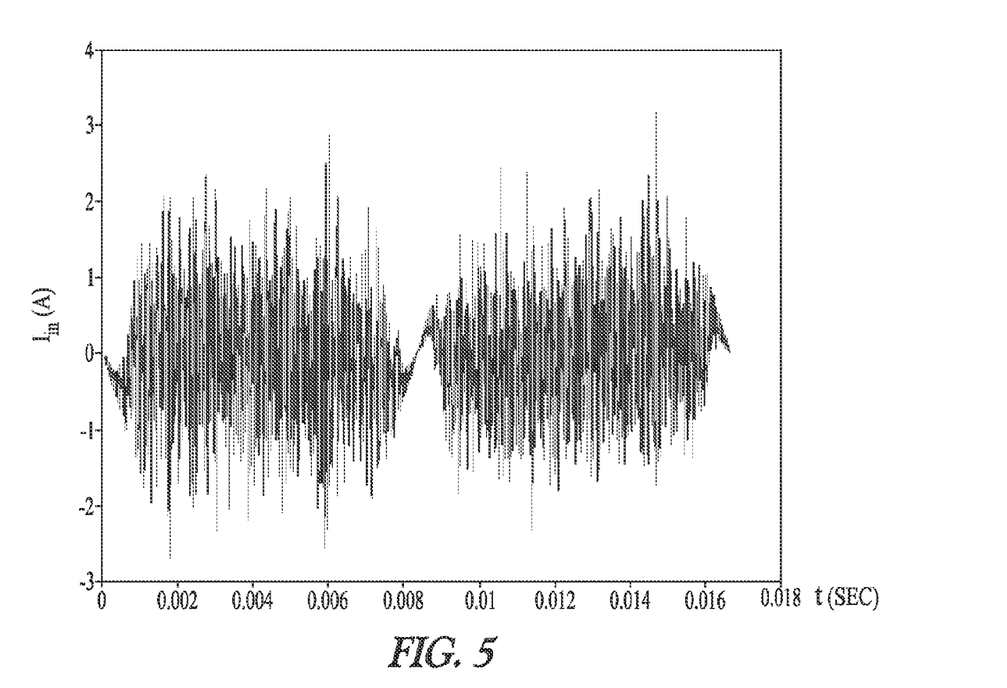
FIG. 5 shows an example of a simulation of the input current of the power converter circuit with the fundamental frequency component removed.
Figure 6A:
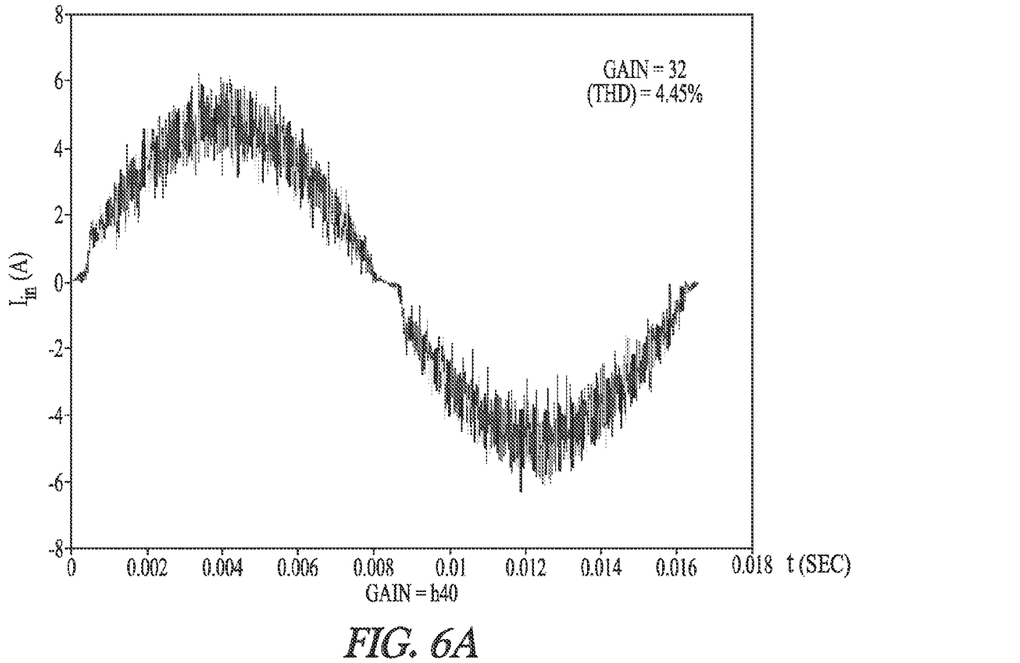
FIG. 6 shows examples of simulation of a power convert circuit with different values of gain of a loop compensation filter.
Figure 6B:
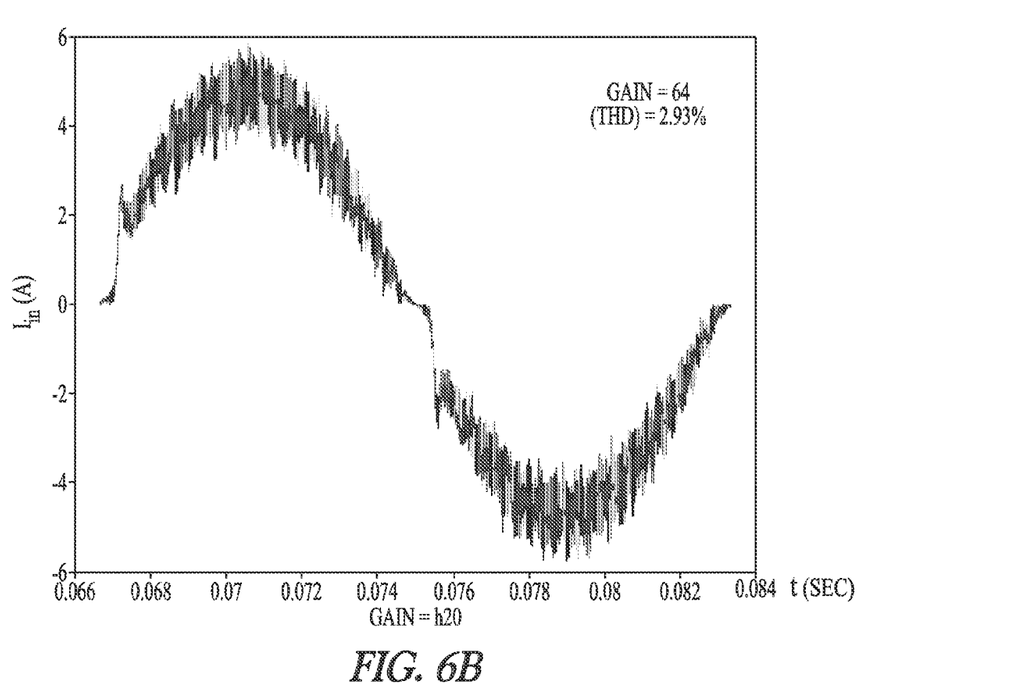
Figure 6C:
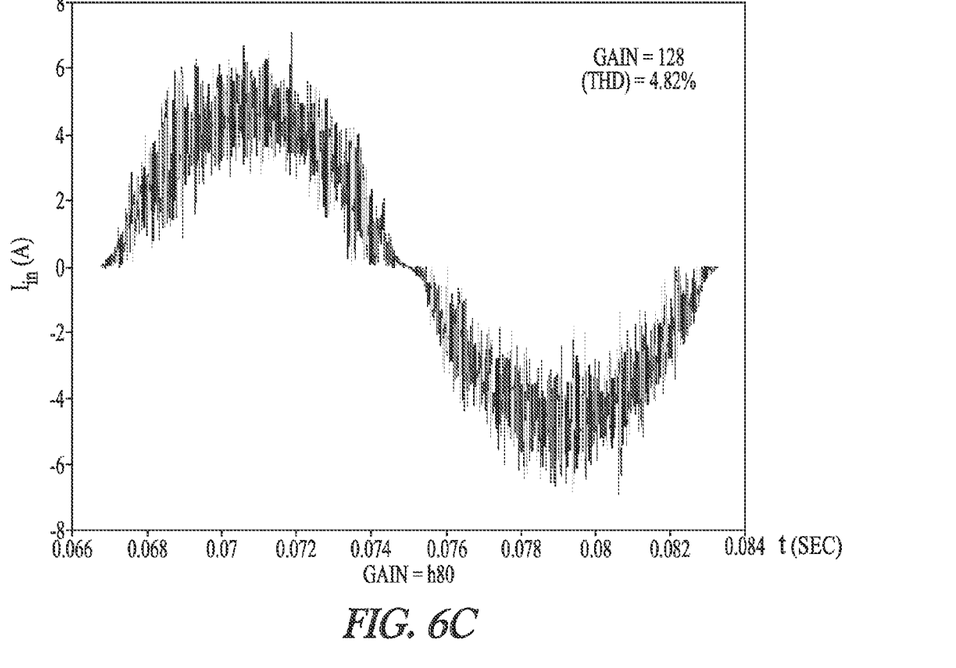
Figure 6D:
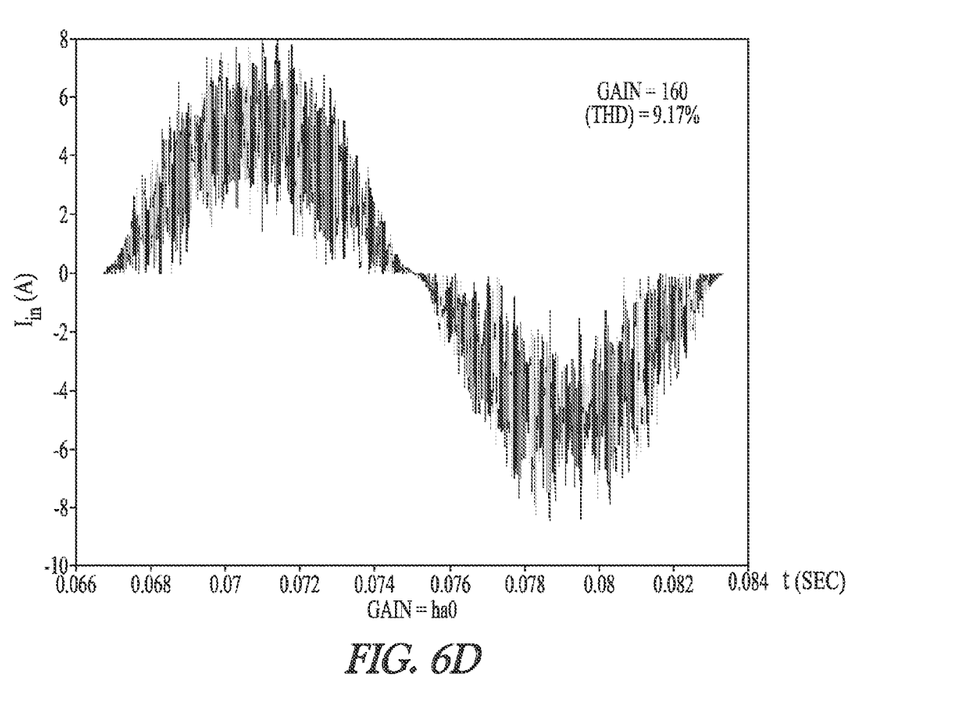

FIG. 5 shows an example of a simulation of the input current to the power converter circuit with the fundamental frequency component removed. With the fundamental signal component removed, THD can be expressed as the RMS value of current noise divided by the amplitude of the fundamental harmonic of the input current, or $$(THD) \approx \frac{\text{RMS}(i\_error)}{I1}. \qquad (3)$$

Therefore, minimizing the value RMS(i_error) can approximate minimizing THD (the cost function). The RMS value of current error can be determined using a digital control loop even while the circuit is online and operating.

Figure 7:
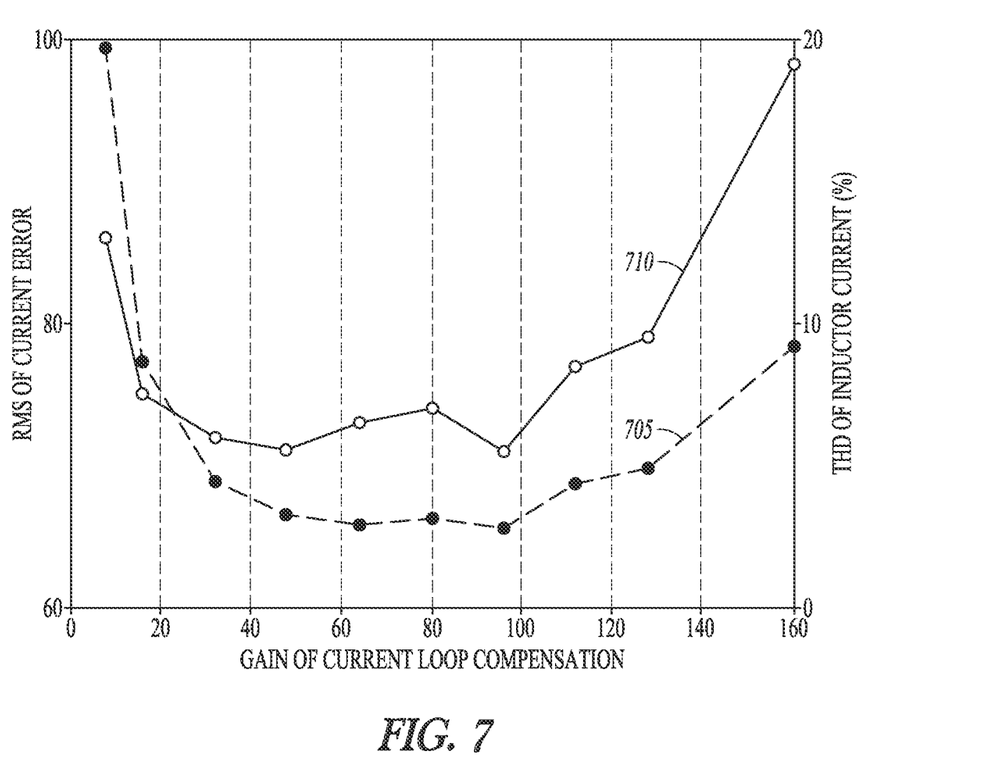
FIG. 7 shows a graph of the THD for different values of gain and a graph of the root mean square value of the current error for the different values of gain.

FIG. 6 shows examples of simulation of a power convert circuit with different gain for the current loop compensation filter Hc(z) in FIG. 2. The waveforms show inductor current for gains of 32, 64, 128, and 160. The waveforms also show values for the THD of the inductor current for the different values of gain. FIG. 7 shows a graph 705 of the THD for different values of gain and a graph 710 of the RMS value of the current error. The graph of THD is "U" shaped and the optimum value corresponds to lowest value of THD. The graph of the RMS value of current error does not exactly match the THD graph, but will result in selection of the optimum value of gain or near-optimum value of gain for the compensation filter.

Figure 8:
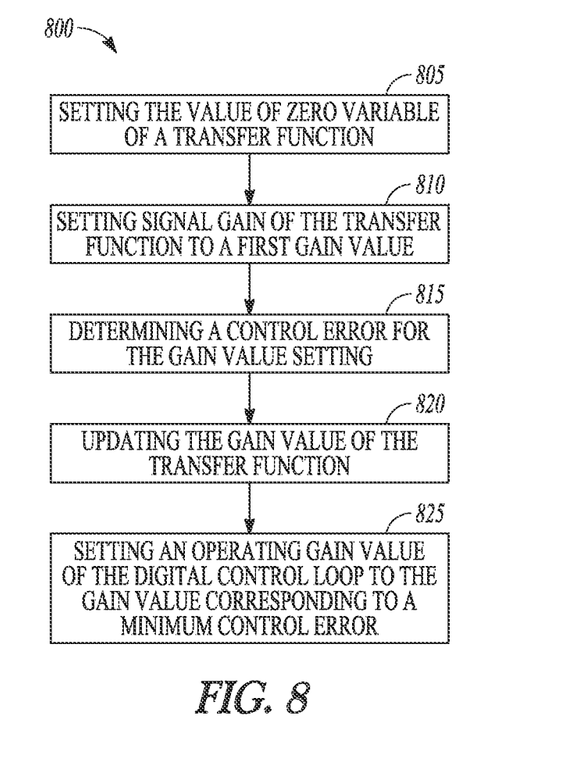
FIG. 8 is a flow diagram of a method for self-tuning of a digital control loop of a power converter circuit.

FIG. 8 is flow diagram of a method 800 for self-tuning of a digital control loop of a power converter circuit, such as the digital control loop circuit of FIG. 2. In some examples, the power converter circuit includes a boost converter circuit topology as shown in FIG. 1. In additional or alternative examples, the power converter circuit may have a buck converter circuit topology or a buck/boost converter circuit topology. The digital control loop circuit may provide power factor correction to regulate power at the circuit load. In some examples, a compensation filter of the digital control loop circuit is automatically tuned by the controller 260 of the digital control loop circuit. The digital control loop circuit may include one or more compensation filters for one or more current control loops of the power converter circuit, and may include one or more compensation filters for one or more voltage control loops of the power converter circuit.

An input signal is applied to the power converter circuit. The input signal can be a sinusoidal input voltage having a fundamental frequency (e.g., 60 Hz). If the self-tuning is done while the power converter circuit is online, the self-tuning may begin when the power converter circuit is in steady state operation. In steady state operation there are no transients in circuit current due to input line transients or transients at the load of the power converter circuit.

At block 805, a first variable of a transfer function of the digital control loop circuit is set to a fixed value while a second variable is changed. If a compensation filter is being self-tuned, the compensation filter may provide PI compensation and the transfer function can include a zero variable and a gain variable.

The zero variable may be set by the tuning module 265 while the gain variable is changed by the tuning module 265. The power converter circuit may be a switching power converter, and the zero variable may be chosen based on the switching frequency of a switching circuit of the power converter. For instance, if the switching frequency is 100 kilohertz (100 kHz), the zero variable can be chosen to be 10 kHz. In certain examples, the power converter circuit is controlled by PWM, and the zero variable is determined using a switching frequency of PWM of the power converter circuit.

At block 810, the signal gain of the transfer function is set to a first gain value. At block 815, a control error is determined for the first gain value setting. For the a current loop compensation filter 245 (Hc(z)) of FIG. 2, the control error may be determined as a difference between a reference current and an input current to the power converter circuit. In some examples, a filter circuit is used to extract a current signal of the fundamental frequency of the input current. In certain examples, the current signal is extracted by averaging the input current. The extracted current signal is used a control current. The control error may be determined as the difference between the reference current and the control current. The control error can provide a measure of distortion of the input current.

As shown in FIG. 1, a multiplier circuit 155 can be used to generate the reference current $i_{ref}$ using a control voltage from the voltage control loop circuit $v_{control}$ and the rectified input voltage $v_g(t)$. If the input is a sine wave signal, $v_g(t)$ is a rectified sine wave, and $i_{ref}$ may be also a rectified sine wave signal. For instance, $i_{ref}$ may be generated by the multiplier circuit 155 according to equation (1) above. The control error can then be a function of the current error (i_error) determined over one period of the reference current. The control current can be compared to the reference current to obtain the current error. In some examples, the multiple periods of the reference current and the control current can be used to determine the current error. Because the reference current is derived from the line voltage, direct knowledge of the line voltage is not required for the compensation filter to be automatically tuned.

Returning to FIG. 8 at block 820, the gain value of the transfer function of the digital control loop is updated iteratively and the control error is determined for the updated gain value. In some examples, the tuning module 265 of FIG. 2 iteratively updates the gain value of the signal gain variable during operation of the power converter circuit. In some examples, the tuning module 265 of FIG. 2 iteratively updates the gain value of the signal gain variable to consecutive values of gain, such as consecutively increasing gain values or consecutively decreasing gain values.

At block 825, the operating gain value of the power converter circuit is automatically set to the gain value corresponding to a minimum control error. In some examples, the tuning module 265 calculates an RMS value of the difference between the control current and the reference current, e.g., RMS(i_error). The tuning module 265 sets the operating gain value to minimize the calculated RMS value. As explained previously herein, the RMS value of the control error can be viewed as a measure or surrogate measure of distortion of the input current. Thus the tuning module 265 sets the operating gain value to the gain value corresponding to minimum distortion. A similar process may then be used to determine the gain variable for the voltage loop compensation filter (Hv(z)) 240.

The tuning module 265 may store the determined values of distortion with the values of gain (e.g., $b_0, b_1, \ldots, b_n$) in memory, such as a lookup table for example, or the tuning module may only store the value of gain with the current lowest value of distortion and update the stored gain value when a lower value of distortion is measured. In some examples, the controller 260 of FIG. 2 initiates multiple tuning operations by the tuning module 265 for multiple operating conditions, and the results are stored in memory. The controller 260 may then automatically set the parameters to those predetermined values corresponding to the lowest distortion for specific detected operating conditions. The controller 260 may delay a self-tuning procedure until detecting that the power converter circuit is operating in steady state. The power converter circuit may include one or both of voltage sensors and current sensors that detect transients. The controller 260 may apply the delay between multiple tuning procedures as the operating conditions are changed.

The several examples described herein show that a digital current control loop can automatically tune itself based on analysis in the time domain. For a power converter system having a current control loop, the self-tuning is implemented to minimize a cost function that corresponds to THD of current in the system. The self-tuning scheme can result in one or more optimized compensation filters without direct knowledge of circuit parameters and the input line voltage. The self-tuning scheme can be applied to all power converter topologies that include one or more current control loops.

Additional Notes

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method of operating a power converter circuit, the method comprising:

setting a value of a zero variable, wherein the zero variable is included in a transfer function of a digital control loop of the power converter circuit;

setting signal gain of the transfer function to a first gain value;

determining a control error for the first gain value setting, wherein the control error is a difference between a reference current and an input current to the power converter circuit;

iteratively updating the gain value of the transfer function and determining the control error for the updated gain value; and setting an operating gain value of the digital control loop of the power converter circuit to the gain value corresponding to a minimum control error.

2. The method of claim 1, wherein setting a value of a zero variable includes setting a value of a zero variable of a transfer function of a compensation filter that implements proportional integral (PI) compensation.

3. The method of claim 1, wherein determining the control error includes determining the control error according to a current error obtained using a difference between the reference current and the control current.

4. The method of claim 3, wherein determining control error includes calculating a root mean square (RMS) value of a difference between the control current and the reference current, and wherein setting an operating gain value includes setting an operating gain value to minimize the calculated RMS value.

5. The method of claim 1, wherein the reference current includes a rectified sine wave current signal and the control error is determined for at least one period of the reference current.

6. The method of claim 1, wherein determining control error includes determining the control error when the power converter is in steady state operation and transients in current are absent in operation of the power converter.

7. An apparatus comprising:

a power converter circuit including an inductor, a switching circuit, and a digital control loop circuit having an adjustable transfer function, wherein the transfer function includes a zero variable and a signal gain variable; and a controller including a tuning module configured to:
set a value for the zero variable;
set the signal gain variable to a first gain value;
determine a control error for the first gain value setting, wherein the control error is a difference between a reference current and a load current at a circuit load;
iteratively update the gain value of the signal gain variable and determine the control error for the updated gain value; and
set an operating gain value of the signal gain variable to the gain value corresponding to a minimum control error.

8. The apparatus of claim 7, wherein the digital control loop circuit includes a compensation filter with a transfer function of $$H(z) = b * \frac{(z-a)}{(z-1)},$$

wherein a is the zero variable and b is the gain variable.

9. The apparatus of claim 7, wherein the tuning module is configured to determine a measure of distortion of the input current and set the operating gain value to the gain value corresponding to minimum distortion.

10. The apparatus of claim 7, wherein the tuning module is configured to calculate a root mean square (RMS) value of the difference between a reference current and a control current as the control error, and to set the operating gain value to the gain value corresponding to a minimum RMS value.

11. The apparatus of claim 10, including a filter circuit configured to extract, as the control current, a current signal having a frequency that is the fundamental frequency of the input current.

12. The apparatus of claim 7, wherein the reference current is a rectified sine wave current signal, and wherein the tuning module is configured to determine the control error for at least one period of the reference current.

13. The apparatus of claim 7, wherein the tuning module is configured to detect steady state operation of the power converter circuit when transients in current are absent in the power circuit, and determine the control error when the power converter circuit is in steady state operation.

14. The apparatus of claim 7, wherein the controller is configured to regulate power provided to a circuit load using pulse width modulation (PWM), and wherein the tuning module is configured to calculate the value of the zero variable using a switching frequency of the PWM.

15. The apparatus of claim 7, wherein the tuning module is configured to iteratively update the gain value of the signal gain variable during operation of the power converter.

16. The apparatus of claim 7, including a multiplier circuit, a circuit load, a first feedback circuit that provides a load voltage to a voltage compensation filter, and a second feedback circuit that provides the load current to a current compensation filter, wherein the voltage compensation filter is configured to compare the load voltage to a reference voltage and generate a control voltage, and wherein the multiplier circuit is configured to adjust the reference current using the control voltage.

17. The apparatus of claim 7, wherein the power converter circuit includes a boost converter circuit topology, and wherein the digital control loop circuit is configured to provide power factor correction to regulate power at the circuit load.

18. An apparatus comprising:
an alternating current (AC) to direct current (DC) converter circuit including rectifier circuit, an inductor, a switching circuit, and a digital control loop circuit having an adjustable transfer function, wherein the transfer function includes a zero variable and a signal gain variable; and
a controller including a tuning module configured to:
set a value for the zero variable;
set the signal gain variable to a first gain value;
determine a control error for the first gain value setting, wherein the control error is a difference between a reference current and a load current at a circuit load;
iteratively update the gain value of the signal gain variable and determine the control error for the updated gain value; and
set an operating gain value of the signal gain variable to the gain value corresponding to a minimum control error.

19. The apparatus of claim 18, wherein the controller is configured to iteratively update the setting for the gain value with consecutive values of gain during operation of the power converter.

20. The apparatus of claim 19, wherein the digital control loop circuit provides power factor correction to regulate power at a circuit load and includes a compensation filter that implements proportional integral (PI) compensation.

* * * * *